United States Patent
Kappi (10) Patent No.: US 12,482,119 B2
(45) Date of Patent: Nov. 25, 2025

(54) METHOD, APPARATUS, AND COMPUTER PROGRAM PRODUCT FOR ESTIMATING MONOCULAR DEPTH WITHIN AN IMAGE USING OBSERVED IMAGE ELEMENTS

(71) Applicant: HERE GLOBAL B.V., Eindhoven (NL)

(72) Inventor: Jani Kappi, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 226 days.

(21) Appl. No.: 18/334,057

(22) Filed: Jun. 13, 2023

(65) Prior Publication Data

US 2024/0420354 A1  Dec. 19, 2024

(51) Int. Cl.
*G06T 7/55* (2017.01)
*B60W 60/00* (2020.01)
*G06T 7/73* (2017.01)
*G06V 20/58* (2022.01)

(52) U.S. Cl.
CPC ............ *G06T 7/55* (2017.01); *B60W 60/001* (2020.02); *G06T 7/74* (2017.01); *G06V 20/58* (2022.01); *B60W 2420/403* (2013.01); *B60W 2556/40* (2020.02); *G06T 2207/30252* (2013.01)

(58) Field of Classification Search
CPC ... G06T 7/55; G06T 7/74; G06T 2207/30252; B60W 60/001; B60W 2556/40; B60W 2420/403; G06V 20/58
See application file for complete search history.

(56) References Cited

U.S. PATENT DOCUMENTS

| | | | |
|---|---|---|---|
| 11,574,462 B1* | 2/2023 | Bhatia | G06T 3/60 |
| 2018/0261005 A1 | 9/2018 | Lin et al. | |
| 2020/0410259 A1* | 12/2020 | Srinivasan | G06F 18/24 |
| 2021/0342589 A1 | 11/2021 | Chawla et al. | |
| 2021/0397855 A1* | 12/2021 | Guizilini | G06T 7/50 |
| 2021/0398310 A1* | 12/2021 | Ge | G06V 10/25 |
| 2024/0005637 A1* | 1/2024 | Iqbal | G01C 21/3807 |
| 2024/0185442 A1* | 6/2024 | Goyal | G05D 1/027 |

(Continued)

FOREIGN PATENT DOCUMENTS

| | | |
|---|---|---|
| CN | 114565908 A | 5/2022 |
| DE | 102019106123 A1 | 9/2019 |
| WO | WO 2022/151664 A1 | 7/2022 |

*Primary Examiner* — Peter D Nolan
*Assistant Examiner* — Mikko Okechukwu Obioha
(74) *Attorney, Agent, or Firm* — Jeffrey R. Moisan; HERE GLOBAL B.V.

(57) ABSTRACT

A method is provided for estimating depth within a two dimensional image. Methods may include: receiving a two dimensional image of an environment captured by an image sensor; extracting pixel coordinates of pixels associated with the one or more objects within the environment from the two dimensional image; correlating the one or more objects within the environment with the one or more map objects of map data; determining a depth of the pixels associated with the one or more objects within the environment based on a location of the one or more map objects in the map data relative to the image sensor; generating a depth map of the pixels associated with the one or more objects; and providing for at least one of navigational assistance or at least partial autonomous control to a vehicle based, at least in part, on the depth map.

20 Claims, 3 Drawing Sheets

(56) References Cited

U.S. PATENT DOCUMENTS

2024/0303833 A1* 9/2024 Boardman .............. G06T 7/344
2024/0362889 A1* 10/2024 Ansari ...................... G06T 7/75
2025/0091607 A1* 3/2025 Wang ................... B60W 40/09

* cited by examiner

METHOD, APPARATUS, AND COMPUTER PROGRAM PRODUCT FOR ESTIMATING MONOCULAR DEPTH WITHIN AN IMAGE USING OBSERVED IMAGE ELEMENTS

TECHNOLOGICAL FIELD

An example embodiment of the present disclosure relates to estimating depth within a two dimensional image, and more particularly, to estimating monocular depth scale using observed map elements within a two dimensional image.

BACKGROUND

Maps have been used for centuries for providing route geometry and geographical information. Conventional paper maps including static images of roadways and geographic features from a snapshot in history have given way to digital maps used by and presented on computers, mobile devices, vehicles, etc. These digital maps can be updated and revised such that users have the most-current maps available to them each time they view a map hosted by a mapping service server. Digital maps can further be enhanced with dynamic information, such as traffic information in real time along roads and through intersections.

As digital maps, including high-definition (HD) digital maps with rich content can span entire continents, these digital maps include vast amounts of information, which can be corrupted through missing or erroneous data such as missing or erroneous lane geometry. Incorrect lane geometry information can be problematic as such lane geometry may be used for route guidance and at least semi-autonomous vehicle control. Inaccurate lane geometries can reduce the effectiveness of route guidance and vehicle autonomy. These HD digital maps provide information that can be leveraged for a wide variety of purposes given the accuracy and volume of available data.

BRIEF SUMMARY

A method, apparatus, and computer program product are provided in accordance with an example embodiment estimating depth within a two-dimensional image, and more particularly, to estimating monocular depth scale using observed map elements within a two dimensional image. Embodiments provided herein include an apparatus having at least one processor and at least one memory including computer program code with the at least one memory and computer program code being configured to, with the processor, cause the apparatus to: receive a two dimensional image of an environment captured by an image sensor; use the two dimensional image as an input to a machine learning model; receive, as output from the machine learning model, identification of one or more objects within the environment; extract pixel coordinates of pixels associated with the one or more objects within the environment from the two dimensional image; correlate the one or more objects within the environment with one or more map objects of the map data; determine a depth of the pixels associated with the one or more objects within the environment based on a location of the one or more map objects in the map data relative to the image sensor; generate a depth map of the pixels associated with the one or more objects; and provide for at least one of navigational assistance or at least partial autonomous control to a vehicle based, at least in part, on the depth map.

According to some embodiments, the image sensor includes a monocular image sensor device, where causing the apparatus to determine the depth of the pixels associated with the one or more objects within the environment based on the location of the one or more map objects in the map data relative to the image sensor includes causing the apparatus to: determine the depth of pixels associated with the one or more objects within the environment based on the location of the one or more map objects in the map data relative to a pose of the monocular image sensor device.

According to certain embodiments, the two dimensional image is a first two dimensional image, where the apparatus is further caused to: receive a second two dimensional image of the environment captured by the image sensor; extract pixel coordinates associated with one or more objects within the environment from the second two dimensional image; correlate the one or more objects within the environment from the second two dimensional image with the one or more objects within the environment from the first two dimensional image; determine a pose estimation of the image sensor at a time when the first two dimensional image was captured; determine a pose estimation of the image sensor at a time when the second two dimensional image was captured; and determine a depth of pixels associated with the one or more objects in the second two dimensional image based, at least in part, on a relative position difference between the pose estimation of the image sensor at a time when the first two dimensional image was captured and the pose estimation of the image sensor at the time when the second two dimensional image was captured.

The apparatus of some embodiments is further caused to determine the relative position difference based, at least in part, on at least one of a motion sensor, an accelerometer, or an inertial measurement unit, wherein the two dimensional image of the environment captured by the image sensor is a first two dimensional image of the environment captured by a first image sensor, wherein the apparatus is further configured to: receive a second two dimensional image of the environment captured by a second image sensor; extract pixel coordinates of pixels associated with one or more objects within the environment from the second two dimensional image; correlate the one or more objects from the first two dimensional image with the one or more objects from the second two dimensional image; and determine a depth of pixels associated with the one or more object from the second two dimensional image based, at least in part, on the depth map of the pixels associated with the objects.

According to some embodiments, the map data includes high definition map data including precise locations of the one or more map objects, where causing the apparatus to generate a depth map of the pixels associated with the one or more objects further includes causing the apparatus to: generate a depth map of pixels not associated with the one or more objects based, at least in part, on estimations of depths using the depth of the pixels associated with the one or more objects within the environment. According to some embodiments, causing the apparatus to provide for at least one of navigational assistance or at least partial autonomous control to the vehicle based, at least in part, on the depth map includes causing the apparatus to: provide for autonomous control of the vehicle to navigate relative to the one or more objects within the environment based, at least in part, on the depth map. According to certain embodiments, the apparatus is further caused to: update the map data to include information from the two dimensional image, wherein the information from the two dimensional image includes at least one of a new object to add to the map data or an update to an existing object in the map data.

Embodiments provided herein include a method including: receiving a two dimensional image of an environment captured by an image sensor; applying an object detection algorithm to the two dimensional image; identifying one or more objects within the environment based on the object detection algorithm; extracting pixel coordinates of pixels associated with the one or more objects within the environment from the two dimensional image; correlating the one or more objects within the environment with the one or more map objects of map data; determining a depth of the pixels associated with the one or more objects within the environment based on a location of the one or more map objects in the map data relative to the image sensor; generating a depth map of the pixels associated with the one or more objects; and providing for at least one of navigational assistance or at least partial autonomous control to a vehicle based, at least in part, on the depth map.

According to some embodiments, the image sensor includes a monocular image sensor device, and where determining the depth of the pixels associated with the one or more objects within the environment based on the location of the one or more map objects in the map data relative to the image sensor includes: determining the depth of the pixels associated with the one or more objects within the environment based on the location of the one or more map objects in the map data relative to a pose of the monocular image sensor device.

According to certain embodiments, the two dimensional image is a first two dimensional image, where the method further includes: receiving a second two dimensional image of the environment captured by the image sensor; extracting pixel coordinates associated with one or more objects within the environment from the second two dimensional image; correlating the one or more objects within the environment from the second two dimensional image with the one or more objects within the environment from the first two dimensional image; determining a pose estimation of the image sensor at a time when the first two dimensional image was captured; determining a pose estimation of the image sensor at a time when the second two dimensional image was captured; and determining a depth of pixels associated with the one or more objects in the second two dimensional image based, at least in part, on a relative position difference between the pose estimation of the image sensor at the time when the first two dimensional image was captured and the pose estimation of the image sensor at the time when the second two dimensional image was captured.

The method of some embodiments further includes determining the relative position difference based, at least in part, on at least one of a motion sensor, an accelerometer, or an inertial measurement unit. According to some embodiments, the two dimensional image of the environment captured by the image sensor is a first two dimensional image of the environment captured by a first image sensor, the method further including: receiving a second two dimensional image of the environment captured by a second image sensor; extracting pixel coordinates of pixels associated with one or more objects within the environment from the second two dimensional image; correlating the one or more objects from the first two dimensional image with the one or more objects from the second two dimensional image; and determining a depth of pixels associated with the one or more objects from the second two dimensional image based, at least in part, on the depth map of the pixels associated with the one or more objects.

According to some embodiments, the map data includes high definition map data including precise locations of the one or more map objects, where generating a depth map of the pixels associated with the one or more objects further includes: generating a depth map of pixels not associated with the one or more objects based, at least in part, on estimations of depths using the depth of the pixels associated with the one or more objects within the environment. According to certain embodiments, providing for at least one of navigational assistance or at least partial autonomous control to the vehicle based, at least in part, on the depth map includes: providing for autonomous control of the vehicle to navigate relative to the one or more objects within the environment based, at least in part, on the depth map. The method of some embodiments includes updating the map data to include information from the two dimensional image, wherein the information from the two dimensional image includes at least one of a new object to add to the map data or an update to an existing object in the map data.

Embodiments provided herein include a computer program product including at least one non-transitory computer-readable storage medium having computer-executable program code instructions stored therein, the computer-executable program code instructions including program code instructions to: receive a two dimensional image of an environment captured by an image sensor; apply an object detection algorithm to the two dimensional image; identify the one or more objects within the environment based on the object detection algorithm; extract pixel coordinates of pixels associated with one or more objects within the environment from the two dimensional image; correlate the one or more objects within the environment with one or more map objects of map data; determine a depth of the pixels associated with the one or more objects within the environment based on a location of the one or more map objects in the map data relative to the image sensor; generate a depth map of the pixels associated with the one or more objects; and provide for at least one of navigational assistance or at least partial autonomous control to a vehicle based, at least in part, on the depth map.

According to some embodiments, the image sensor includes a monocular image sensor device, and where the program code instructions to determine a depth of the pixels associated with the one or more objects within the environment based on the location of the one or more map objects in the map data relative to the image sensor include program code instructions to: determine the depth of the pixels associated with the one or more objects within the environment based on the location of the one or more map objects in the map data relative to a pose of the monocular image sensor device.

According to certain embodiments, wherein the two dimensional image is a first two dimensional image, further including program code instructions to: receive a second two dimensional image of the environment captured by the image sensor; extract pixel coordinates associated with one or more objects within the environment from the second two dimensional image; correlate the one or more objects within the environment from the second two dimensional image with the one or more objects within the environment from the first two dimensional image; determine a pose estimation of the image sensor at a time when the first two dimensional image was captured; determine a pose estimation of the image sensor at a time when the second two dimensional image was captured; and determine a depth of pixels associated with the one or more objects in the second two dimensional image based, at least in part, on a relative position difference between the pose estimation of the image sensor at the time when the first two dimensional image was captured and the pose estimation of the image sensor at the time when the second two dimensional image was captured.

According to some embodiments, the program code instructions to provide for at least one of navigational assistance or at least partial autonomous control to the vehicle based, at least in part, on the depth map include program code instructions to provide for autonomous control of the vehicle to navigate relative to the one or more objects within the environment based, at least in part, on the depth map.

Embodiments provided herein include an apparatus including: means for receiving a two dimensional image of an environment captured by an image sensor; means for applying an object detection algorithm to the two dimensional image; means for identifying one or more objects within the environment based on the object detection algorithm; means for extracting pixel coordinates of pixels associated with the one or more objects within the environment from the two dimensional image; means for correlating the one or more objects within the environment with the one or more map objects of map data; means for determining a depth of the pixels associated with the one or more objects within the environment based on a location of the one or more map objects in the map data relative to the image sensor; means for generating a depth map of the pixels associated with the one or more objects; and means for providing for at least one of navigational assistance or at least partial autonomous control to a vehicle based, at least in part, on the depth map.

According to some embodiments, the image sensor includes a monocular image sensor device, and where the means for determining the depth of the pixels associated with the one or more objects within the environment based on the location of the one or more map objects in the map data relative to the image sensor includes: means for determining the depth of the pixels associated with the one or more objects within the environment based on the location of the one or more map objects in the map data relative to a pose of the monocular image sensor device.

According to certain embodiments, the two dimensional image is a first two dimensional image, where the apparatus further includes: means for receiving a second two dimensional image of the environment captured by the image sensor; means for extracting pixel coordinates associated with one or more objects within the environment from the second two dimensional image; means for correlating the one or more objects within the environment from the second two dimensional image with the one or more objects within the environment from the first two dimensional image; means for determining a pose estimation of the image sensor at a time when the first two dimensional image was captured; means for determining a pose estimation of the image sensor at a time when the second two dimensional image was captured; and means for determining a depth of pixels associated with the one or more objects in the second two dimensional image based, at least in part, on a relative position difference between the pose estimation of the image sensor at the time when the first two dimensional image was captured and the pose estimation of the image sensor at the time when the second two dimensional image was captured.

The apparatus of some embodiments further includes means for determining the relative position difference based, at least in part, on at least one of a motion sensor, an accelerometer, or an inertial measurement unit. According to some embodiments, the two dimensional image of the environment captured by the image sensor is a first two dimensional image of the environment captured by a first image sensor, the apparatus further including: means for receiving a second two dimensional image of the environment captured by a second image sensor; means for extracting pixel coordinates of pixels associated with one or more objects within the environment from the second two dimensional image; means for correlating the one or more objects from the first two dimensional image with the one or more objects from the second two dimensional image; and means for determining a depth of pixels associated with the one or more objects from the second two dimensional image based, at least in part, on the depth map of the pixels associated with the one or more objects.

According to some embodiments, the map data includes high definition map data including precise locations of the one or more map objects, where the means for generating a depth map of the pixels associated with the one or more objects further includes: means for generating a depth map of pixels not associated with the one or more objects based, at least in part, on estimations of depths using the depth of the pixels associated with the one or more objects within the environment. According to certain embodiments, the means for providing for at least one of navigational assistance or at least partial autonomous control to the vehicle based, at least in part, on the depth map includes: means for providing for autonomous control of the vehicle to navigate relative to the one or more objects within the environment based, at least in part, on the depth map. The apparatus of some embodiments includes means for updating the map data to include information from the two dimensional image, wherein the information from the two dimensional image includes at least one of a new object to add to the map data or an update to an existing object in the map data.

BRIEF DESCRIPTION OF THE DRAWINGS

Having thus described example embodiments of the disclosure in general terms, reference will now be made to the accompanying drawings, which are not necessarily drawn to scale, and wherein:

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A system, method, apparatus, and computer program product are provided herein in accordance with an example embodiment for estimating depth within a two-dimensional image, and more particularly, to estimating a monocular depth scale using observed map elements within a two dimensional image. Depth estimation using stereo cameras, LIDAR (light distancing and ranging), or similar technologies is commonplace and is often employed by vehicles having some degree of autonomous control and robots requiring object distance information and tracking. It is also used in SLAM (Simultaneous Localization and Mapping) solutions providing local mapping capability to the vehicle level.

Depth and distance information has a wide variety of applications. Some example use cases include automated vehicle navigation to positioning and obstacle avoidance. In these systems, it is often critical to be able to accurately and efficiently measure a distance to objects or tracked artifacts correctly in all possible observation angles, conditions, and environments. In solutions using actual distance measuring sensors such as stereo cameras or LIDAR, obtaining distance and position information can be relatively straight forward. There are however many use cases which do not benefit from having distance measuring sensors available, such as mobile device users and systems carrying only monocular image sensors. Further, use cases that employ distance measuring sensors can experience sensor failures (e.g., hardware failures and/or software failures) that limit the distance measuring capabilities of the associated system.

Monocular depth estimation (MDE) algorithms aim to address the challenge of obtaining depth and position information from two-dimensional imagery. However, these algorithms suffer from scale ambiguity, which means that they can only be used when identifying relative order of the visible objects. It is generally not possible to obtain correct metric distance measures. Embodiments provided herein provide the capability to estimate three dimensional (3D) metric depth from two dimensional (2D) images. Embodiments open many use cases and application domains from positioning, mapping, and navigation solutions, for example. Embodiments provided herein can determine depth from a single image.

Embodiments described herein rely upon rich high-definition (HD) map data that includes map objects such as lanes of road segments, intersections, and the like. However, HD maps also include a wide variety of map objects. These map objects include discrete objects having discrete locations, and continuous objects that do not have a discrete location. Discrete objects include objects such as signs, road barriers, pole-type objects, lane lines, etc. Continuous objects include objects that extend along a path, such as lane lines, curbing, guard rails, and the like. Map objects within HD map data are used for a variety of purposes including navigational assistance, facilitation of autonomous vehicle control, localization, etc.

As technology advances, the data available for collection has increased in volume, such as with location data from personal hand-held devices and vehicles. Further, data from sensors attached to located vehicles (e.g., image sensors, LiDAR (light distancing and ranging), etc.) and satellite imagery further enhances location data. The available data includes vast amounts of useful information, some of which is time sensitive. For example, traffic jams caused by accidents may be resolved after one hour, but within that one hour the information about the accident and the traffic jam is very valuable and informative to others traveling near the location of the accident. Other available data can include temporally sensitive data that relates to road construction, lane closures, temporary route changes, etc. This corpus of data is available for the construction and healing or updating of HD maps to include objects, such as the discrete and continuous objects described above, that are located within an environment with a high degree of accuracy.

The collection of rich sensor data from vehicles traveling within a road network, such as image data (e.g., 360-degree camera views) and LiDAR (Light Distancing and Ranging) requires expensive sensor arrays associated with vehicles traveling within a road network. While such technology is being adopted at an ever-increasing rate, this sensor data still has limited coverage relative to the total volume of roads that exist. Further, significant manual effort is still required to derive lane geometry and attributes such as lane count and turn lane data from sensor rich data. Processes are being developed and refined for full automation of the creation of high definition (HD) maps including lane geometry and selected attributes from probe data provides improved HD map coverage and enhanced safety functionality. This ever-increasing coverage of HD map data provides an opportunity for embodiments described herein to estimate monocular depth within a 2D image using observed elements within the image as compared to HD map data.

Figure 1:
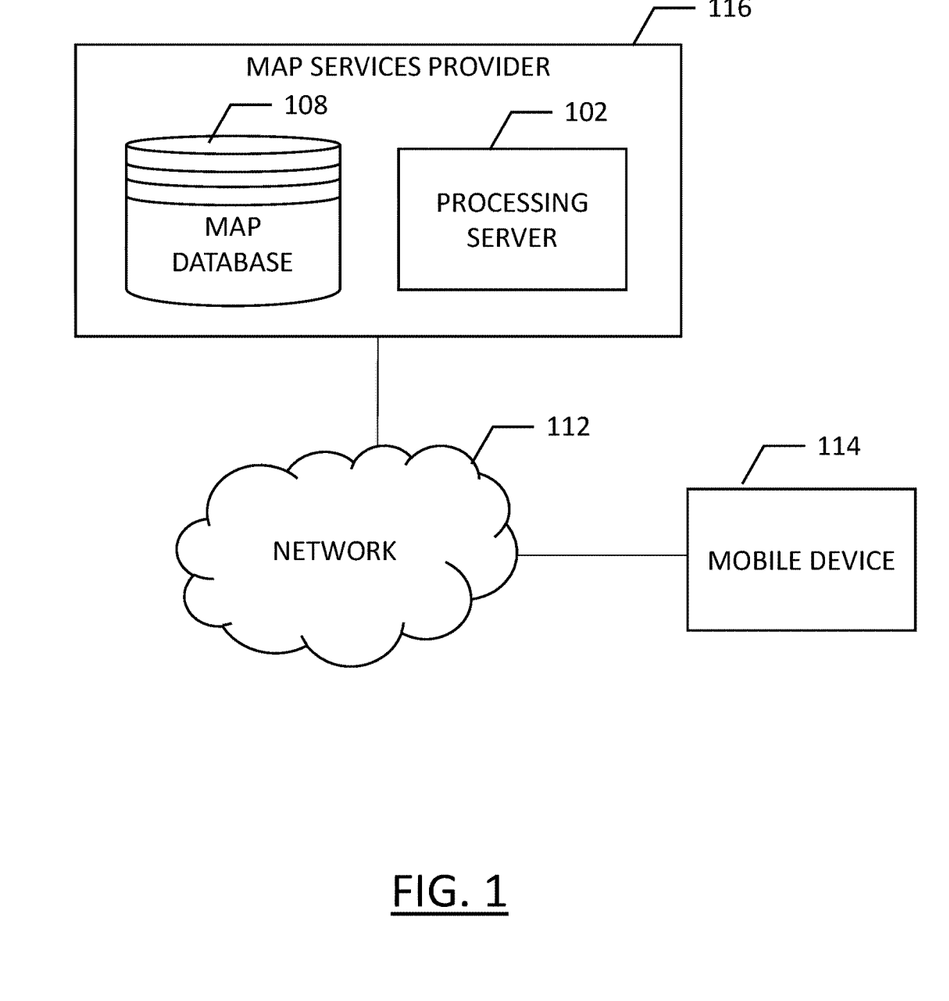
FIG. 1 illustrates a communication diagram of a system for implementing example embodiments described herein according to an example embodiment of the present disclosure.

FIG. 1 illustrates a communication diagram of an example embodiment of a system for implementing example embodiments described herein. The illustrated embodiment of FIG. 1 includes a map services provider 116, a processing server 102 in data communication with a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

The map database 108 may include node data, road segment data or link data, point of interest (POI) data, or the like. The map database 108 may also include cartographic data, routing data, and/or maneuvering data. The map database 108 can include HD map data as described above. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. Also, probe data histogram images, aerial imagery, LiDAR data, and dash camera images among others, can be used to generate map geometries directly or through machine learning. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

An ADAS, as described herein, may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn paths there through. Thus, it is important to have continuous features remain continuous within the map data as provided by embodiments herein.

While the mobile device 114 may be used by an end-user for navigation, driver assistance, autonomous or semi-autonomous vehicle control, or various other features, the mobile device 114 may provide map data to the map services provider 116 for purposes of updating, building, restoring, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, cartesian coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

Figure 2:
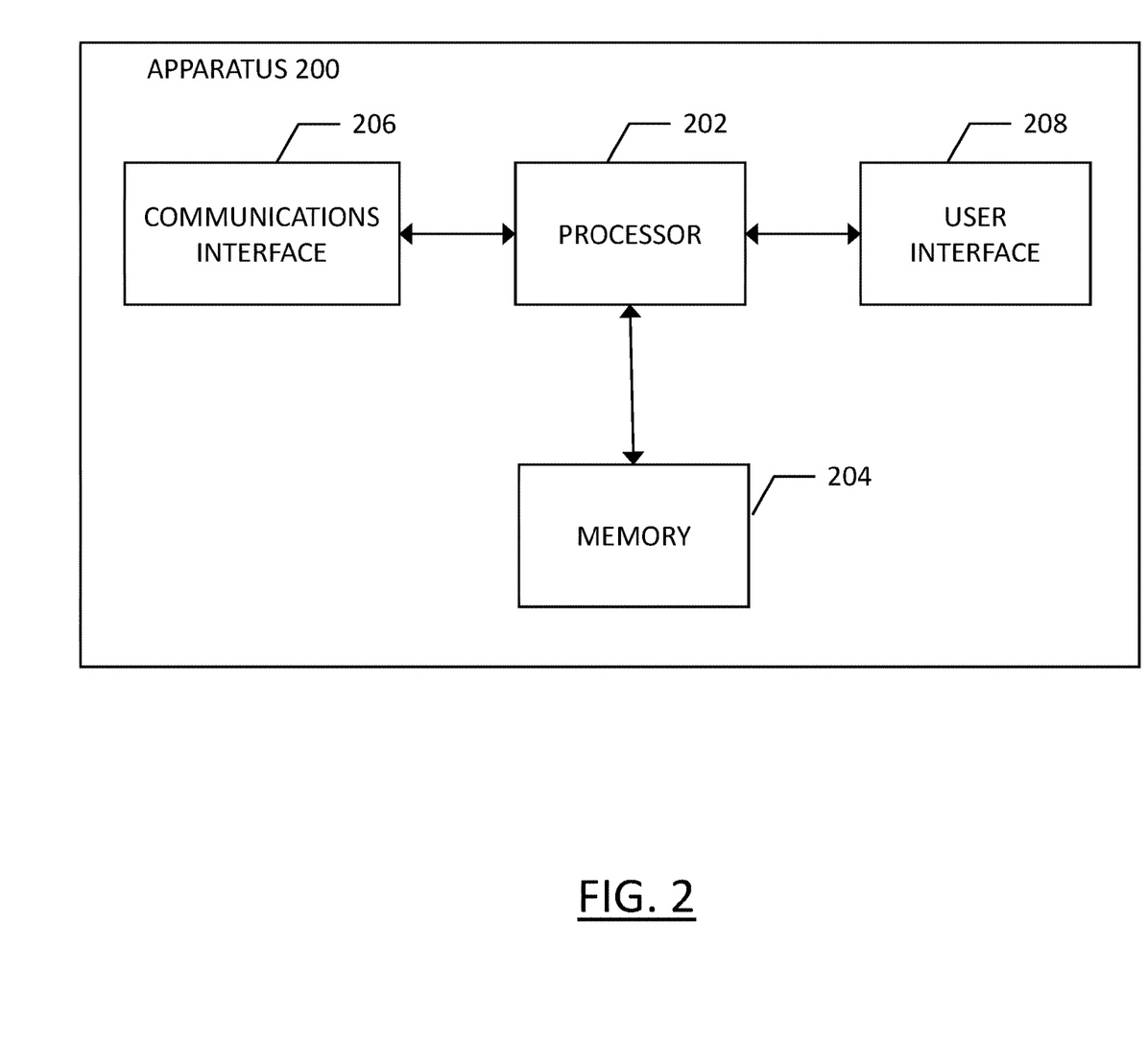
FIG. 2 is a block diagram of an apparatus for generating map data from images according to an example embodiment of the present disclosure.

An example embodiment of a processing server 102 may be embodied in an apparatus as illustrated in FIG. 2. The apparatus, such as that shown in FIG. 2, may be specifically configured in accordance with an example embodiment of the present disclosure for revising map geometry based on a detailed analysis of probe data and existing map geometry. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Embodiments described herein can further employ a processer embodied by a Graphics Processing Unit (GPU) specifically configured for neural network implementations and/or image processing capitalizing on efficient processing capabilities using multiple parallel operations. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Mobile devices such as mobile device 114 may be used for a variety of purposes that require proper identification of a location and surroundings. For example, localization for navigational assistance, autonomous or semi-autonomous vehicle control, or augmented reality. The mobile device may not have sensor capability or capacity to identify objects in three dimensions. This may be due to sensor failures or the sensors with which the mobile device is equipped. As such, the device may require depth estimation of objects captured within two dimensional images. This is challenging as a two dimensional image generally lacks sufficient information to provide three dimensional positioning of objects within the image. Embodiments described herein provide a method, apparatus, and computer program product to generate a depth map of an image to identify the depth position of objects within the image. The depth map reflecting a distance of objects within the image from the sensor with which the image was captured can be used for localization, navigation, autonomous vehicle control, etc. These depth maps provide accurate representations of distances of objects in an environment leveraging map data from HD maps.

Obtaining distances through depth maps of a two dimensional image is challenging. Monocular depth maps can be scaled in some cases using proximity sensors; however, the range of such proximity sensors is very limited rendering this solution of limited benefit. Using time-of-flight sensors like LIDAR-type sensors implemented in mobile devices can extend this range to some degree, but usability is still constrained. Using an inertial measurement unit (IMU) and SLAM (Simultaneous Localization and Mapping) solution can provide camera pose estimates that can be used to compute relative metric motion of the camera and thus estimate the depth scale. Accuracy of such a system is highly dependent upon motion sensor noise and user motion profiles. These approaches cannot solve the single image use case. Some monocular depth estimation algorithms attempt to estimate absolute scale using Deep Neural Networks and/or Convolutional Neural Network approaches, but their accuracy is very coarse and does not provide a solution to the single, 2D image problem.

Embodiments described herein use high-definition geometries of map elements such as lanes of a road and localization objects to estimate absolute scale of the depth map. Embodiments determine monocular depth through detection of map elements from a 2D image, and estimate monocular depth scale using pixel coordinates, map geometry data, and camera parameters.

Embodiments employ a method of estimating a scale factor from a monocular depth using high-definition map data. Pixel coordinates of observed map objects are identified from the monocular 2D image. This extraction process can employ traditional image processing techniques or Artificial Intelligence (AI) derived object or feature detection or extraction algorithms. The monocular depth map can then be calculated using the same 2D image. This process enables pixel to relative depth mapping. This results in each of the observed objects having camera frame pixel coordinates and relative depth estimates available.

The above described process works well when the image used in depth estimation is the same image used for object detection. If the image used in depth estimation is not the same image used for object detection, the relative pose change can be determined before the algorithm is applied. This requires a translation between the position from which object detection was performed to the position from which the two dimensional image was captured that will be used for depth estimation.

The metric distances between elements and objects can be calculated accurately using the HD map data. The objects and elements can be fetched from the map data using previously known device location and pose. As described above, the HD map data includes a vast amount of data concerning objects and positions in real world coordinates. These objects can be added to a map through initial data collection techniques, and refined through the supplementation of data collection from crowd sourcing of sensor-equipped vehicles and mobile devices traveling through an environment. This data collection provides accurate and reliable object details and positions that can be used by embodiments herein to reidentify objects within two dimensional images as the corresponding objects in the HD map data. The world coordinates and distances can be transformed to a 3D mesh (geometry) or used directly to fit the depth pixel coordinates to world coordinates. This operation includes using pixel coordinates of the extracted elements or objects, together with map geometries and camera parameters to assign depth scale.

The depth scale calculated by example embodiments of the algorithm presented herein benefits from multiple objects within the two dimensional image, with at least some of the multiple objects being at different depths relative to a pose or position of the image capture device. This enables the depth scale to be calculated using two or more relative depths from the pose which results in a more accurate depth scale.

Not all objects identified within an image will be correlated with corresponding objects within the HD map data. For example, objects that are of a temporal nature, such as temporary signage, road construction objects, detours, other vehicles, pedestrians, etc. may not be present in HD map data since they regularly change. Further, objects that are away from a roadway may not be present in HD map data. For example, a sign on a building, a building façade, pedestrian walkways, etc. may not be captured in HD map data as they may be beyond the scope of the HD map data content. While the depth of these objects that are not found in the map data relative to the pose of the image sensor is not positively identified as with objects of the image found in the HD map data, the depth can be estimated using the objects of the image found in the HD map data. Further, the depth of objects not found in the HD map data can be identified, at least in part, based on context clues. For example, fire hydrants are of relatively similar sizes, such that a size of a fire hydrant object identified within a two dimensional image can provide an indication of its depth, or how far it is from where the image was captured.

The above-described examples can identify a depth map from an image based on map objects identified within HD map data. However, additional images can employ the depth map generated using a first two dimensional images to facilitate depth map generation for those additional images. For example, a first image captured at a first pose can employ the example embodiments described above to generate a depth map of identified map objects, and to use that depth map to estimate the depth of other objects within the image. A second image can be captured and used in multiple scenarios. A second image can be from the same image sensor or camera as the first image, but captured at a different position. Optionally, the second image can be from a second image sensor or camera from a different device traveling proximate the same environment of the first image. These secondary images can benefit from the depth map of the first image.

For example, the second image can be employed as a stereoscopic image to be used with the first image for triangulation of an object location for improved accuracy. A pose of the image sensor capturing the second image can be obtained from a variety of locating mechanisms. For example, the image sensor for the second image can be located based on conventional locating means including satellite locating means (e.g., GPS), cellular triangulation, etc. The location of the image sensor for the second image can optionally be determined based on image correlation, where the objects in the image are compared against HD map data to obtain a location within an environment. If the image sensor for the second image is the same as the image sensor for the first image, a location or pose of the image sensor for the second image can be established based on a location and pose for the first image, along with movement information of the image sensor, which may be obtained from an accelerometer, motion sensor, or inertial measurement unit (IMU), for example.

Understanding a location pose from which a second image is captured enables the first image and second image to be used together to improve a depth scale of each of the two dimensional images. Further, the first image and second image can be used cooperatively to better understand the environment functioning as stereo images from which more accurate distances can be established.

Being able to identify depth of objects found within a two dimensional image has wide ranging applicability. Embodiments described herein can be employed to facilitate navigation of a vehicle and autonomous or semi-autonomous vehicle control. For example, a mobile device capturing images of an environment can identify objects within the images and their relative positions. These relative positions enable control of a vehicle to navigate within the environment. A specific use case can entail a vehicle with some degree of autonomy capturing images of the environment, and being able to use those images to identify other vehicles on the road along with static mapped objects to autonomously move through the environment and to autonomously park within a parking space.

In addition to embodiments described herein being able to facilitate navigation and autonomous vehicle control, embodiments can be used to update or heal HD map data using data from the captured two dimensional images. A two dimensional image may be captured of an environment, with one or more objects within the image correlated with map objects in the HD map data. Other objects in the two dimensional image may be captured and identified, such as using object detection algorithms or machine learning, and the newly identified objects can be added to the HD map data. Optionally, objects in the HD map data can be updated using the two dimensional image and the associated depth map. For example, a tree proximate a roadway may exist as a discrete object in map data. The HD map data may not have a current accurate size of the tree. The data from the two dimensional image can be used to update the HD map data to reflect the current size of the tree and its encroachment of a roadway, for example.

Using the two dimensional images generated from mobile devices, embodiments optionally employ image processing models and algorithms to facilitate the extraction of three dimensional map geometry from the images. Embodiments provided herein employ machine learning to train image detection using training images to properly identify objects such as lane lines, poles, signs, and boundaries from image sensor data from mobile devices including vehicles.

Figure 3:
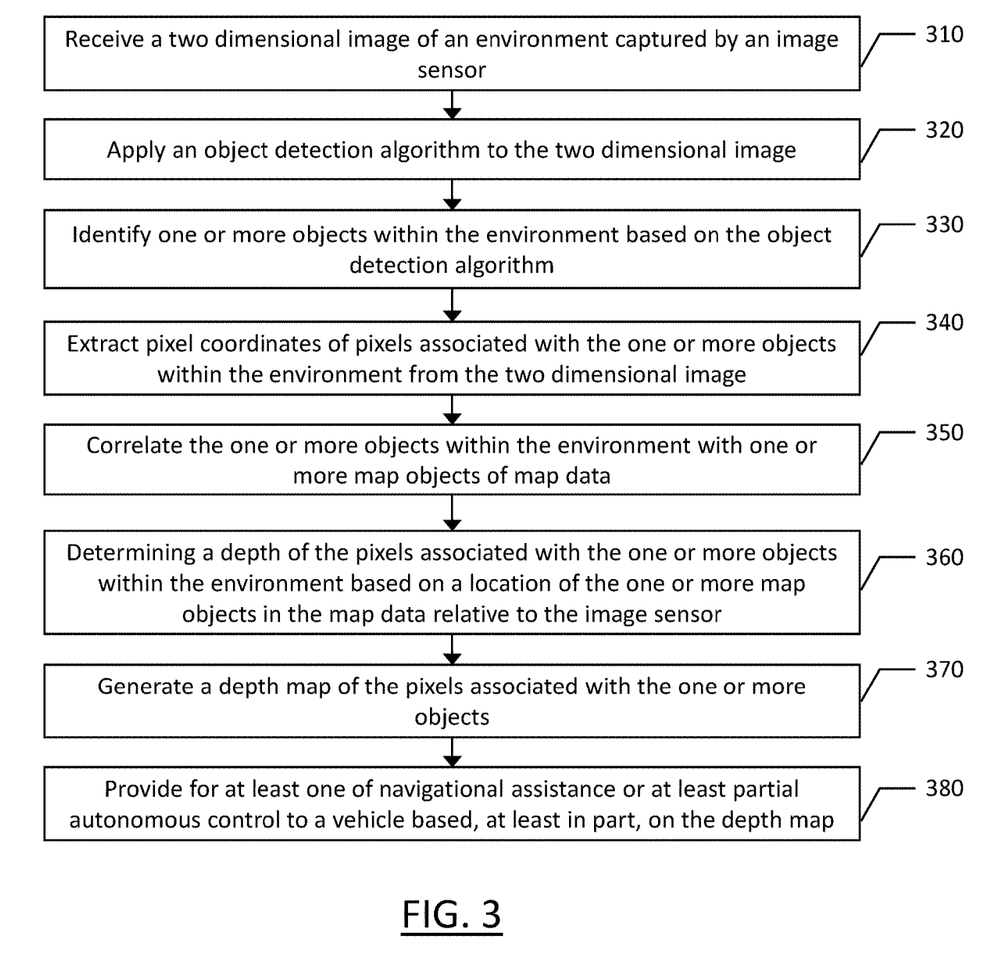
FIG. 3 is a flowchart of a method estimating depth within a two dimensional image according to an example embodiment of the present disclosure.

FIG. 3 illustrates a flowchart depicting methods according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

An operation of an example apparatus will herein be described with reference to the flow chart of FIG. 3. The illustrated method may be performed, for example, by apparatus 200 using processor 202 with program code instructions stored in memory 204 to cause the apparatus to perform the operations of the method of FIG. 3. As shown at 310, a two dimensional image of an environment captured by an image sensor is received. An object detection algorithm is applied at 320 to the two dimensional image to detect objects within the image. One or more objects are identified at 330 within the environment based on the object detection algorithm. Pixel coordinates are extracted at 340 of pixels associated with the one or more objects within the environment from the two dimensional image. The one or more objects within the environment are correlated with one or more map objects of map data as shown at 350. A depth of the pixels associated with the one or more objects within the environment is determined at 360 based on a location of the one or more map objects in the map data relative to the image sensor. A depth map of the pixels associated with the one or more objects is generated at 370. At least one of navigational assistance or at least partial autonomous vehicle control is provided for a vehicle at 330 based, at least in part, on the depth map.

In an example embodiment, an apparatus for performing the methods of FIG. 3 above may include a processor (e.g., the processor 202) configured to perform some or each of the operations (310-380) described above. The processor may, for example, be configured to perform the operations (310-380) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-380 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
   receive a two dimensional image of an environment captured by an image sensor;
   use the two dimensional image as an input to a machine learning model;
   receive, as output from the machine learning model, identification of one or more objects within the environment;
   extract pixel coordinates of pixels associated with the one or more objects within the environment from the two dimensional image;
   correlate the one or more objects within the environment with one or more map objects of map data;
   determine a depth of the pixels associated with the one or more objects within the environment based on a location of the one or more map objects in the map data relative to the image sensor;
   generate a depth map of the pixels associated with the one or more objects; and
   provide for at least one of navigational assistance or at least partial autonomous control to a vehicle based, at least in part, on the depth map.

2. The apparatus of claim 1, wherein the image sensor comprises a monocular image sensor device, and wherein causing the apparatus to determine the depth of the pixels associated with the one or more objects within the environment based on the location of the one or more map objects in the map data relative to the image sensor comprises causing the apparatus to:
   determine the depth of the pixels associated with the one or more objects within the environment based on the location of the one or more map objects in the map data relative to a pose of the monocular image sensor device.

3. The apparatus of claim 1, wherein the two dimensional image is a first two dimensional image, wherein the apparatus is further caused to:
   receive a second two dimensional image of the environment captured by the image sensor;
   extract pixel coordinates associated with one or more objects within the environment from the second two dimensional image;
   correlate the one or more objects within the environment from the second two dimensional image with the one or more objects within the environment from the first two dimensional image;
   determine a pose estimation of the image sensor at a time when the first two dimensional image was captured;
   determine a pose estimation of the image sensor at a time when the second two dimensional image was captured; and determine a depth of pixels associated with the one or more objects in the second two dimensional image based, at least in part, on a relative position difference between the pose estimation of the image sensor at the time when the first two dimensional image was captured and the pose estimation of the image sensor at the time when the second two dimensional image was captured.

4. The apparatus of claim 3, wherein the apparatus is further caused to determine the relative position difference based, at least in part, on at least one of a motion sensor, an accelerometer, or an inertial measurement unit.

5. The apparatus of claim 1, wherein the two dimensional image of the environment captured by the image sensor is a first two dimensional image of the environment captured by a first image sensor, wherein the apparatus is further configured to:
receive a second two dimensional image of the environment captured by a second image sensor;
extract pixel coordinates of pixels associated with one or more objects within the environment from the second two dimensional image;
correlate the one or more objects from the first two dimensional image with the one or more objects from the second two dimensional image; and
determine a depth of pixels associated with the one or more object from the second two dimensional image based, at least in part, on the depth map of the pixels associated with the objects.

6. The apparatus of claim 1, wherein the map data comprises high definition map data including precise locations of the one or more map objects, wherein causing the apparatus to generate a depth map of the pixels associated with the one or more objects further comprises causing the apparatus to:
generate a depth map of pixels not associated with the one or more objects based, at least in part, on estimations of depths using the depth of the pixels associated with the one or more objects within the environment.

7. The apparatus of claim 1, wherein causing the apparatus to provide for at least one of navigational assistance or at least partial autonomous control to the vehicle based, at least in part, on the depth map comprises causing the apparatus to:
provide for autonomous control of the vehicle to navigate relative to the one or more objects within the environment based, at least in part, on the depth map.

8. The apparatus of claim 1, wherein the apparatus is further caused to:
update the map data to include information from the two dimensional image, wherein the information from the two dimensional image comprises at least one of a new object to add to the map data or an update to an existing object in the map data.

9. A method comprising:
receiving a two dimensional image of an environment captured by an image sensor;
applying an object detection algorithm to the two dimensional image;
identifying one or more objects within the environment based on the object detection algorithm;
extracting pixel coordinates of pixels associated with the one or more objects within the environment from the two dimensional image;
correlating the one or more objects within the environment with one or more map objects of map data;
determining a depth of the pixels associated with the one or more objects within the environment based on a location of the one or more map objects in the map data relative to the image sensor;
generating a depth map of the pixels associated with the one or more objects; and
providing for at least one of navigational assistance or at least partial autonomous control to a vehicle based, at least in part, on the depth map.

10. The method of claim 9, wherein the image sensor comprises a monocular image sensor device, and wherein determining the depth of the pixels associated with the one or more objects within the environment based on the location of the one or more map objects in the map data relative to the image sensor comprises:
determining the depth of the pixels associated with the one or more objects within the environment based on the location of the one or more map objects in the map data relative to a pose of the monocular image sensor device.

11. The method of claim 9, wherein the two dimensional image is a first two dimensional image, wherein the method further comprises:
receiving a second two dimensional image of the environment captured by the image sensor;
extracting pixel coordinates associated with one or more objects within the environment from the second two dimensional image;
correlating the one or more objects within the environment from the second two dimensional image with the one or more objects within the environment from the first two dimensional image;
determining a pose estimation of the image sensor at a time when the first two dimensional image was captured;
determining a pose estimation of the image sensor at a time when the second two dimensional image was captured; and
determining a depth of pixels associated with the one or more objects in the second two dimensional image based, at least in part, on a relative position difference between the pose estimation of the image sensor at the time when the first two dimensional image was captured and the pose estimation of the image sensor at the time when the second two dimensional image was captured.

12. The method of claim 11, further comprising determining the relative position difference based, at least in part, on at least one of a motion sensor, an accelerometer, or an inertial measurement unit.

13. The method of claim 9, wherein the two dimensional image of the environment captured by the image sensor is a first two dimensional image of the environment captured by a first image sensor, the method further comprising:
receiving a second two dimensional image of the environment captured by a second image sensor;
extracting pixel coordinates of pixels associated with one or more objects within the environment from the second two dimensional image;
correlating the one or more objects from the first two dimensional image with the one or more objects from the second two dimensional image; and
determining a depth of pixels associated with the one or more objects from the second two dimensional image based, at least in part, on the depth map of the pixels associated with the one or more objects.

14. The method of claim 9, wherein the map data comprises high definition map data including precise locations of the one or more map objects, wherein generating a depth map of the pixels associated with the one or more objects further comprises:

generating a depth map of pixels not associated with the one or more objects based, at least in part, on estimations of depths using the depth of the pixels associated with the one or more objects within the environment.

15. The method of claim 9, wherein providing for at least one of navigational assistance or at least partial autonomous control to the vehicle based, at least in part, on the depth map comprises:

providing for autonomous control of the vehicle to navigate relative to the one or more objects within the environment based, at least in part, on the depth map.

16. The method of claim 9, further comprising:

updating the map data to include information from the two dimensional image, wherein the information from the two dimensional image comprises at least one of a new object to add to the map data or an update to an existing object in the map data.

17. A computer program product comprising at least one non-transitory computer-readable storage medium having computer-executable program code instructions stored therein, the computer-executable program code instructions comprising program code instructions to:

receive a two dimensional image of an environment captured by an image sensor;

apply an object detection algorithm to the two dimensional image;

identify the one or more objects within the environment based on the object detection algorithm;

extract pixel coordinates of pixels associated with one or more objects within the environment from the two dimensional image;

correlate the one or more objects within the environment with one or more map objects of map data;

determine a depth of the pixels associated with the one or more objects within the environment based on a location of the one or more map objects in the map data relative to the image sensor;

generate a depth map of the pixels associated with the one or more objects; and provide for at least one of navigational assistance or at least partial autonomous control to a vehicle based, at least in part, on the depth map.

18. The computer program product of claim 17, wherein the image sensor comprises a monocular image sensor device, and wherein the program code instructions to determine a depth of the pixels associated with the one or more objects within the environment based on the location of the one or more map objects in the map data relative to the image sensor comprise program code instructions to:

determine the depth of the pixels associated with the one or more objects within the environment based on the location of the one or more map objects in the map data relative to a pose of the monocular image sensor device.

19. The computer program product of claim 17, wherein the two dimensional image is a first two dimensional image, further comprising program code instructions to:

receive a second two dimensional image of the environment captured by the image sensor;

extract pixel coordinates associated with one or more objects within the environment from the second two dimensional image;

correlate the one or more objects within the environment from the second two dimensional image with the one or more objects within the environment from the first two dimensional image;

determine a pose estimation of the image sensor at a time when the first two dimensional image was captured;

determine a pose estimation of the image sensor at a time when the second two dimensional image was captured; and determine a depth of pixels associated with the one or more objects in the second two dimensional image based, at least in part, on a relative position difference between the pose estimation of the image sensor at the time when the first two dimensional image was captured and the pose estimation of the image sensor at the time when the second two dimensional image was captured.

20. The computer program product of claim 17, wherein the program code instructions to provide for at least one of navigational assistance or at least partial autonomous control to the vehicle based, at least in part, on the depth map comprise program code instructions to:

provide for autonomous control of the vehicle to navigate relative to the one or more objects within the environment based, at least in part, on the depth map.

* * * * *